(12) United States Patent
Unrath

(10) Patent No.: US 6,186,565 B1
(45) Date of Patent: Feb. 13, 2001

(54) LIFT APPARATUS FOR ATTENUATOR CUSHION

(76) Inventor: Albert W. Unrath, 1610 Bethlehem Pike, Hatfield, PA (US) 19440

( * ) Notice: Under 35 U.S.C. 154(b), the term of this patent shall be extended for 0 days.

(21) Appl. No.: 09/181,191

(22) Filed: Oct. 28, 1998

(51) Int. Cl.[7] .......................... B60R 19/02; B60R 19/32; B60R 19/34; B60R 19/56
(52) U.S. Cl. ...................... 293/133; 293/102; 293/134; 296/35.2
(58) Field of Search .................... 296/118, 35.2; 293/1, 102, 120, 133, 134

(56) References Cited

U.S. PATENT DOCUMENTS

| | | | |
|---|---|---|---|
| 4,189,275 | 2/1980 | Arnold | 414/640 |
| 4,583,716 | 4/1986 | Stephens et al. | 256/13.1 |
| 5,052,732 | * 10/1991 | Oplet et al. | 293/102 |
| 5,562,392 | 10/1996 | Raben | 414/608 |
| 5,642,792 | 7/1997 | June | 188/377 |
| 5,697,657 | * 12/1997 | Unrath, Sr. | 293/133 |
| 5,733,062 | 3/1998 | Orberth et al. | 404/6 |

* cited by examiner

Primary Examiner—D. Glenn Dayoan
Assistant Examiner—Greg Blankenship
(74) Attorney, Agent, or Firm—Edward J. Howard; Buchanan Ingersoll PC

(57) ABSTRACT

A lift apparatus adapted to be mounted on a vehicle for supporting an attenuator cushion comprising a vehicle mounted support frame; a support member coupled to said support frame and extending outward from said vehicle; and a mounting bracket to which the attenuator cushion is coupled, the mounting bracket pivotably coupled to the support member along an axis to pivot between a horizontal deployed position in which the cushion extends generally outward from the vehicle, and a vertical position in which the cushion extends vertically upward, wherein the mounting bracket engages the support member along a majority of the width of the mounting bracket when the cushion is in the vertical position.

23 Claims, 10 Drawing Sheets

LIFT APPARATUS FOR ATTENUATOR CUSHION

FIELD OF THE INVENTION

This invention relates generally to lift systems and in particular, to a vehicle-mounted lift apparatus having an impact attenuation cushion coupled thereto for lifting and transporting the attenuation cushion.

BACKGROUND OF THE INVENTION

Lift systems for positioning and carrying impact attenuation cushions are well known in the art. A variety of different types of lift systems exist. One such apparatus is shown in FIG. 7 (prior art) which shows a hydraulic lift system coupled to the rear of a mobile vehicle such as a truck. The lift is attached to the truck by a series of welds and bolts and operates to pivot the attenuation cushion 28 between a substantially horizontal position parallel to the road surface, and a vertical position perpendicular to the longitudinal axis of the truck. The lift apparatus operates to place the impact attenuation cushion in the vertical or "non-operational" position to enable transportation of the device. Such a system is described in commonly assigned U.S. Pat. No. 5,697,657 entitled VEHICLE MOUNTED CRASH ATTENUATION SYSTEM, and incorporated herein by reference. In the above-identified patent, the carrying surface 78 operates to engage a bottom surface of the attenuation cushion, and includes a series of through holes for receiving bolts so as to enable the attenuation cushion to be bolted to surface 78 at a plurality of locations. The carrying surface 78 and corresponding cushion 28 operate via hydraulics to pivot about the transverse or z-axis to either the horizontal (deployed) or vertical (non-operational) position. A similar prior art design is illustrated in FIG. 8 and described in U.S. Pat. No. 5,642,792 entitled HIGHWAY CRASH CUSHION issued Jul. 1, 1997 to David L. James and assigned to Energy Absorption Systems, Inc.

As shown in FIG. 8, a truck mounted attenuator cushion 12 includes an attachment frame 78 which is pivotably mounted to a front section 16 to pivot about pivot axis 80. A hydraulic actuator 82 mounted between the front section 16 and attachment frame 78, extends and/or retracts so as to tilt the TMA unit 12 to the vertical/or horizontal stage position.

However, significant problems exist with these designs. First, the hydraulics unit operates not only to pivot the attenuation cushion, but also operates to hold the cushion in place, causing severe stress and wear on the actuator. Moreover, in prior art lift assemblies, the attenuator cushion is suspended from, rather than resting on, or supported by, the lift apparatus. This suspension causes increased tension on the hydraulics as well as on portions of the lift apparatus, resulting in increased wear and early failures for these lifts. Furthermore, the structural characteristics and architecture of the prior art lift assemblies have resulted in rotation of the lift apparatus between a horizontal and vertical crash cushion position such that the distance of the crash cushion from the ground when placed in the vertical position is significantly higher than when in the horizontal position. The combination of the relative height from the ground and "suspension" of the impact cushion leads to undue sway or lateral displacement (i.e. rocking) of the impact cushion during transportation, often resulting in damage to the cushion, even at relatively low speeds (e.g. 10 mph). Thus, when such a cushion is transported over any relatively long distance (e.g. 100 miles) the cushion may break or suffer structural damage as a result of its inherent instability, when suspended on prior art lift devices.

Accordingly, it is highly desirable to obtain a lift apparatus which operates to carry and support rather than suspend the impact attenuation cushion to minimize lateral displacement and to eliminate structural support of the cushion by the hydraulics, thereby preventing undue strain and wear on the cushion, as well as on the hydraulics.

SUMMARY OF THE INVENTION

It is an object of the present invention to provide a lift apparatus adapted to be mounted on a vehicle for supporting an attenuator cushion comprising a vehicle mounted support frame; a support member coupled to said support frame and extending outward from said vehicle; and a mounting bracket to which the attenuator cushion is coupled, the mounting bracket pivotably coupled to the support member along an axis to pivot between a horizontal deployed position in which the cushion extends generally outward from the vehicle, and a vertical position in which the cushion extends vertically upward, wherein the mounting bracket engages the support member along a majority of the width of the mounting bracket when the cushion is in the vertical position.

It is a further object of the present invention to provide a vehicle mounted crash attenuator comprising a crushable, energy-absorbing crash cushion; and a lift apparatus coupled to the vehicle for rotating the crash cushion between a horizontal deployed position in which the cushion extends generally outward from the vehicle, and a vertical position in which the cushion extends vertically upward, comprising a substantially vertical support frame attached to the vehicle; a support member extending outward from the support frame and fixedly coupled thereto along a longitudinal axis at a first end; a mounting bracket for receiving the crash cushion and securing thereto, the mounting bracket rotatably coupled to a second end of the support member, and actuator means for causing the mounting bracket to rotate about an axis to cause rotation of the crash cushion between the horizontal deployed position and the vertical position, wherein the actuator means does not support the crash cushion mounting when the cushion is in the vertical position.

It is still a further object of the present invention to provide a lift apparatus wherein the difference in distance of the attenuator cushion from the ground when in the vertical position relative to the horizontal position is substantially a function of the height of the cushion support member.

DETAILED DESCRIPTION OF THE INVENTION

Figure 1:
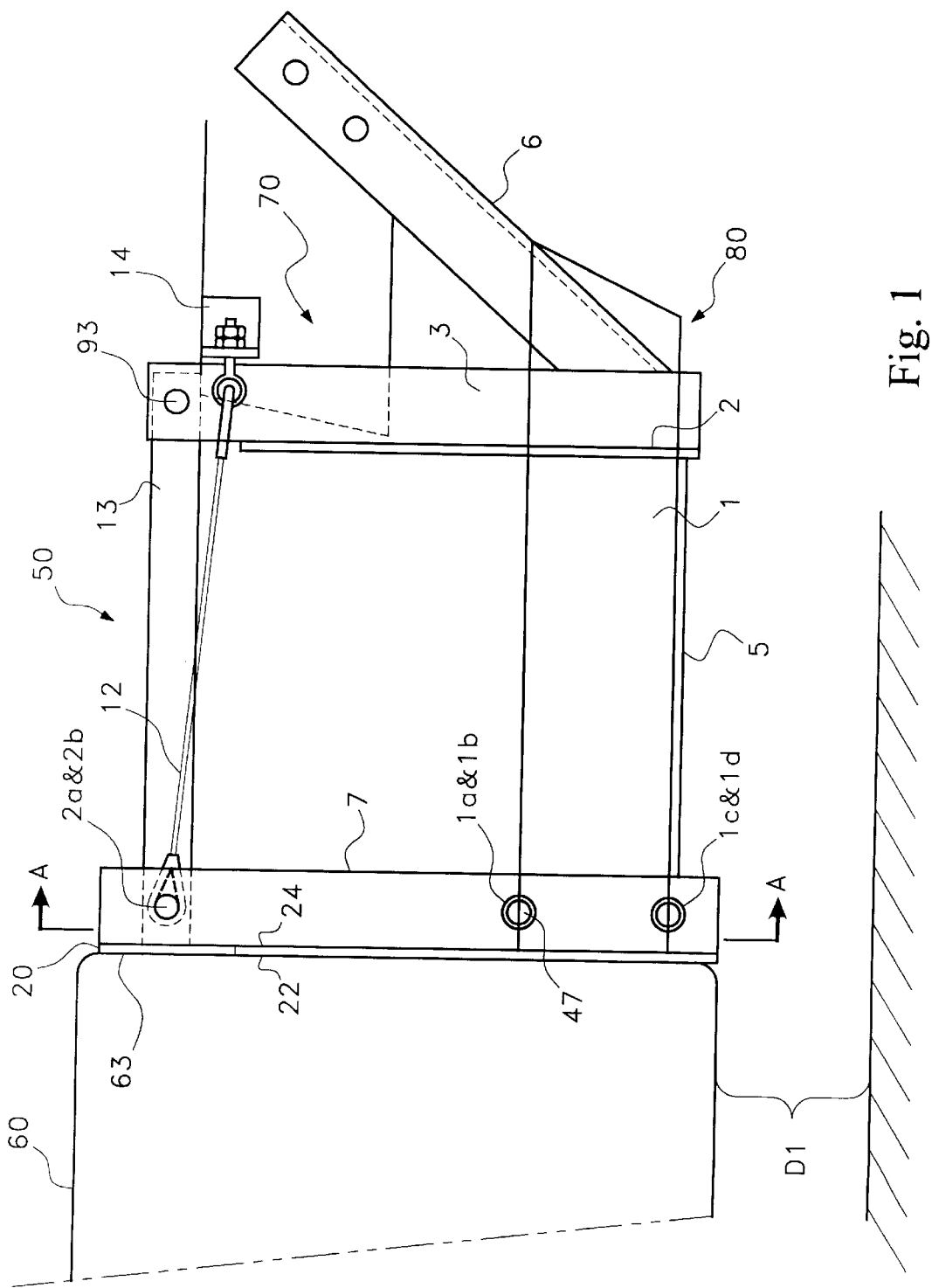
FIG. 1 is a side view of a lift assembly according to an embodiment of the present invention with the impact attenuation cushion in the operating or horizontal position.

Referring now to the Figures, wherein like reference numerals are used to indicate like parts, a lift assembly 50 is shown coupled between an impact attenuation cushion 60, also referred to as an attenuator cushion, and a truck frame 70 for positioning and supporting the attenuator cushion both during operational deployment and during transportation (i.e. non-operation). The lift assembly 50 comprises a pair of cushion support members 1 coupled between a vehicle mounted support frame 80 and a mounting plate 20. In a first embodiment shown in FIGS. 1–3 and 6, mounting plate 20 is fixedly coupled at surface 22 to opposing surface 63 of the attenuator cushion 60 via conventional means, (e.g. welding) to provide a mounting plate which is integral with the cushion. The plate 20 is substantially planar and of uniform thickness and extends virtually over the entire length and width of cushion surface 63. In this embodiment, the cushion is preferably a 100 kilometer (i.e. 100K) energy absorbing attenuator cushion, with the mounting plate comprising a ³⁄₁₆ inch steel plate welded to the cushion. Since the mounting plate is welded to the cushion, the plate requires no holes formed therein for mounting, nor does it require any articulated shape or cavity (such as a C-shape) for engaging and retaining the cushion. Oppositely disposed surface 24 of mounting plate 20 (FIG. 1) is coupled to each of the cushion support members I via corresponding vertically positioned mounting hinge angles 7 welded to surface 24. In this embodiment, the mounting plate for a 100K crash cushion is substantially 90" W×111" L×34" H.

Figure 4:
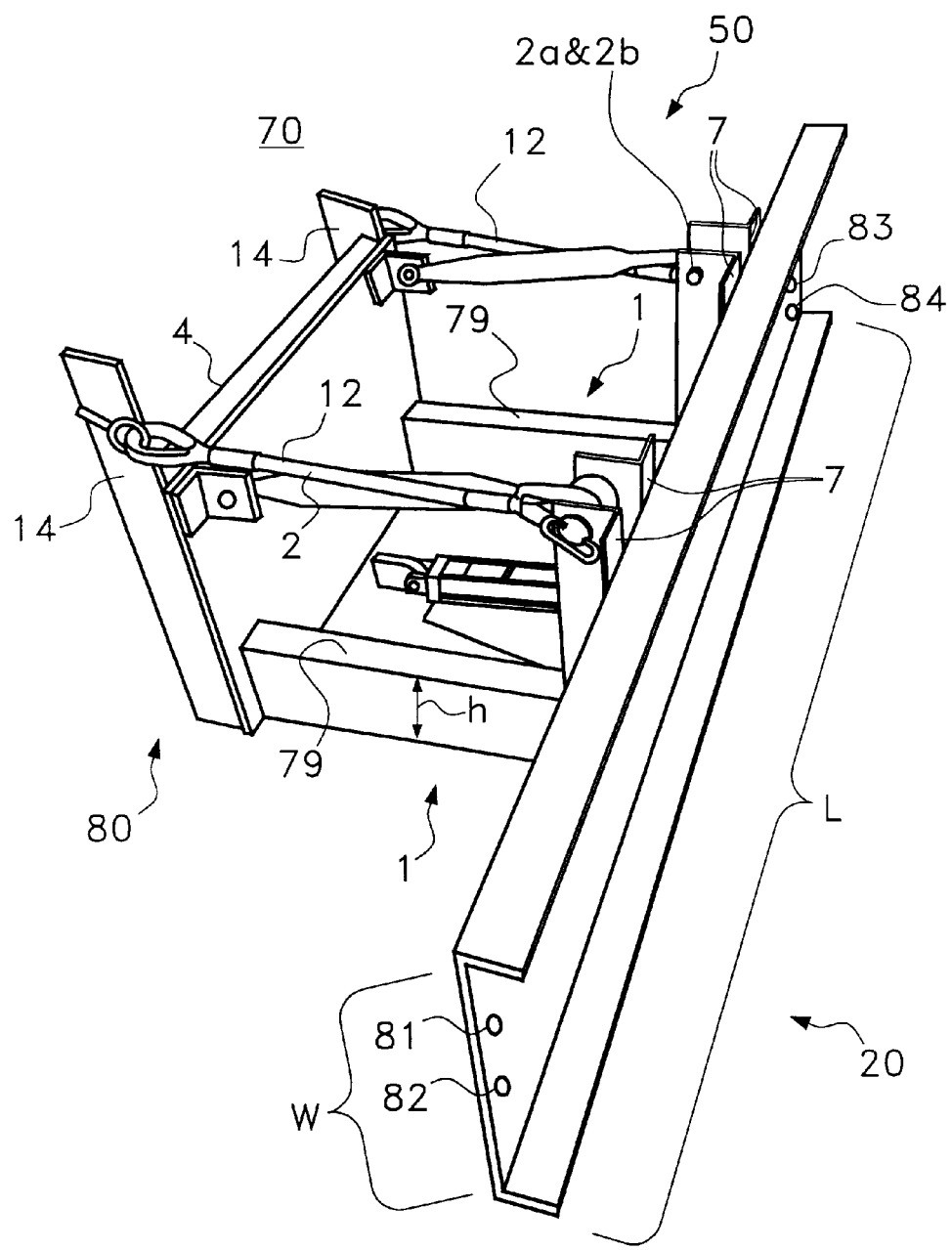
FIG. 4 is a perspective view of a lift assembly in the operating position according to another embodiment of the present invention where the mounting bracket is detachably coupled to the attenuator cushion.
Figure 5:
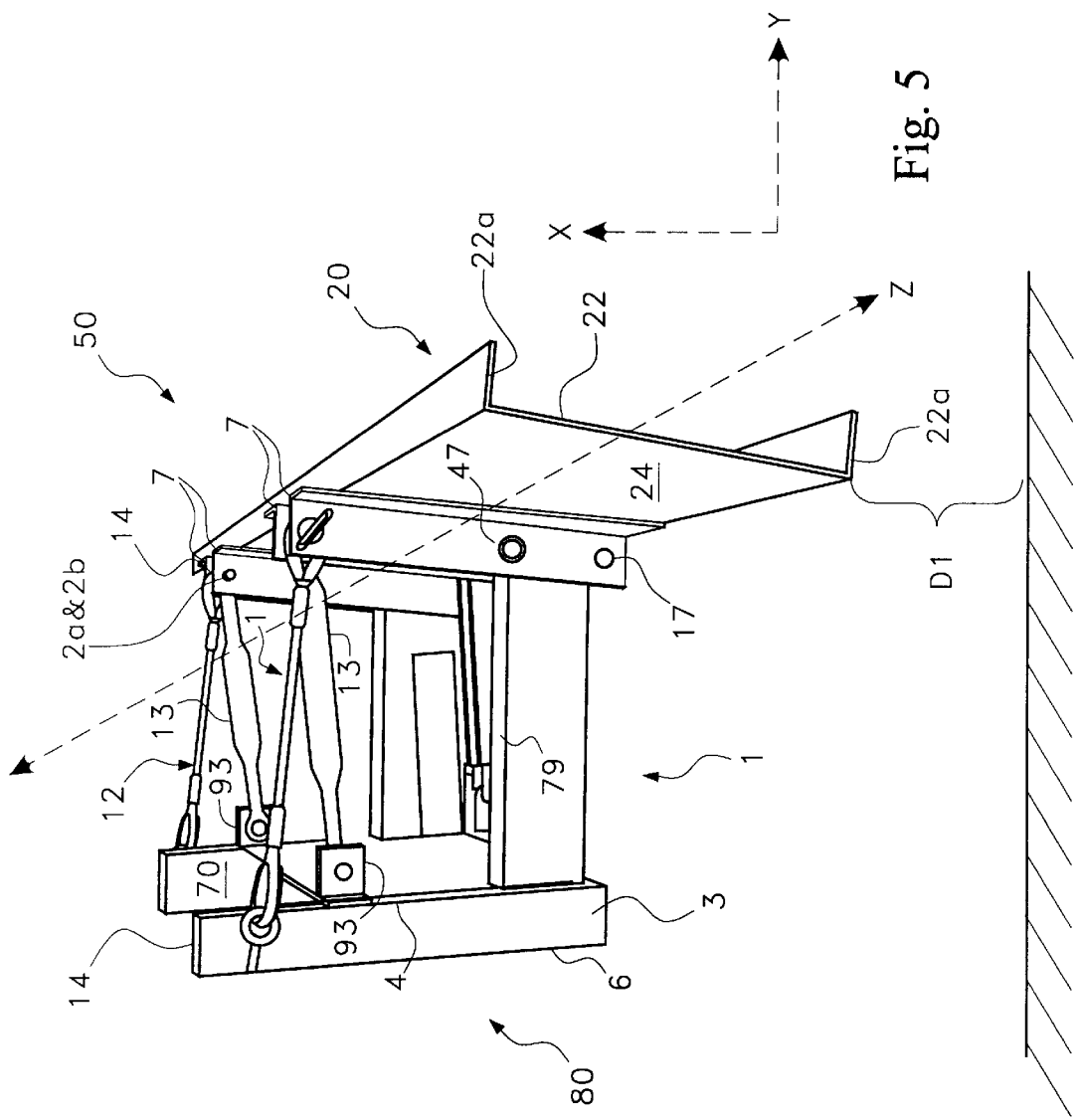
FIG. 5 is a side perspective view of the lift assembly of FIG. 4 in the operating position according to the present invention.
Figure 6:
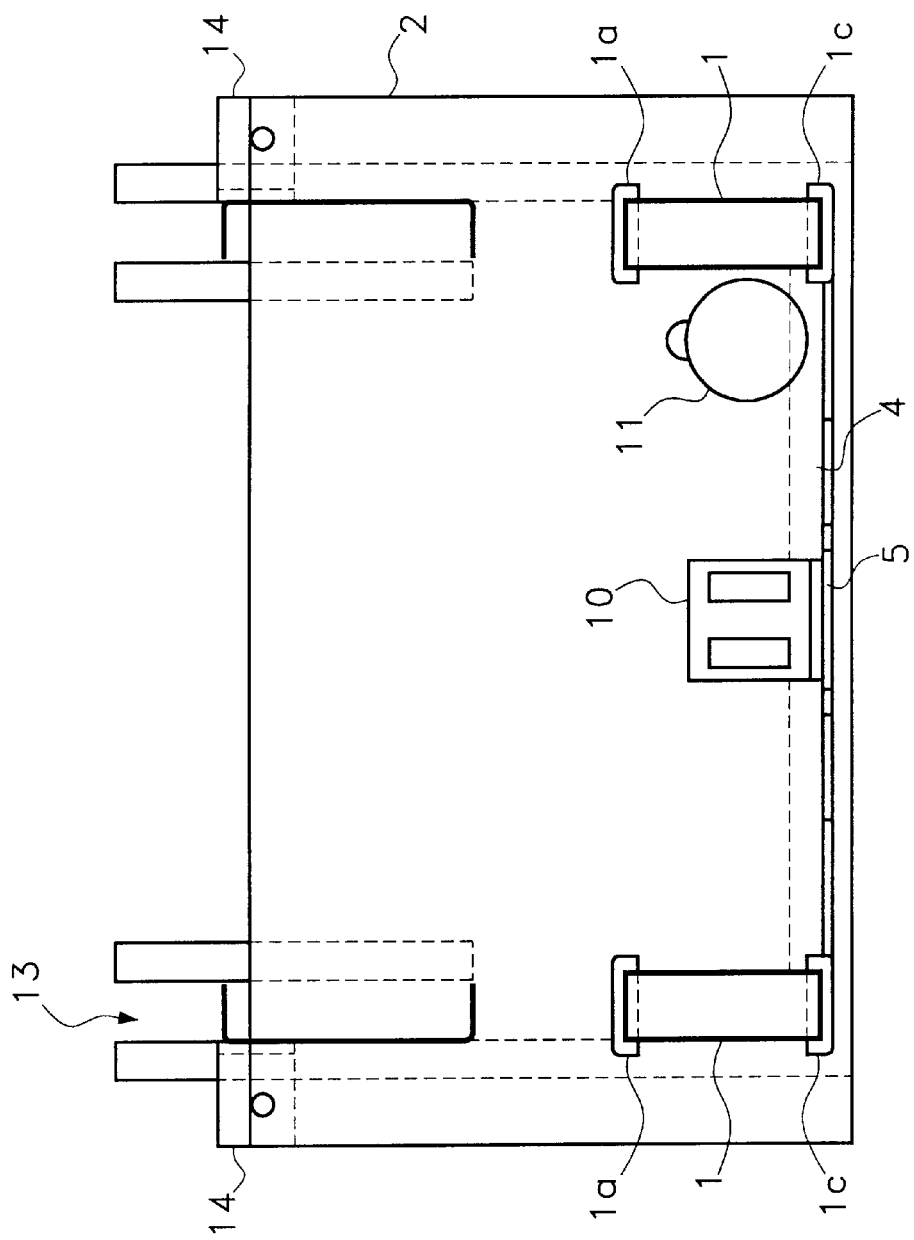
FIG. 6 is a cross-section view looking forward along line AA of the lift assembly of FIG. 1 according to the present invention.
Figure 7:
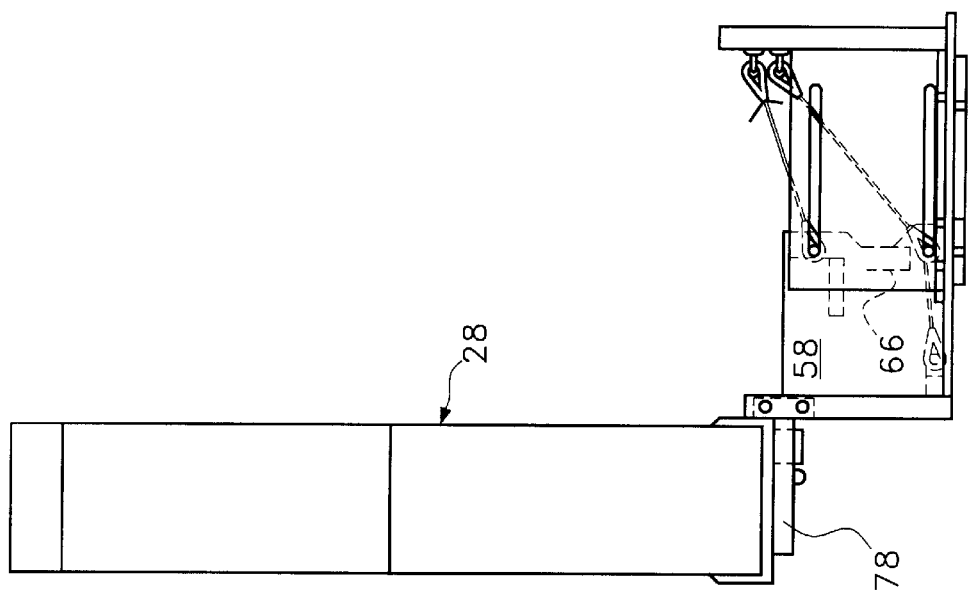
FIG. 7 is an exemplary illustration of a prior art lift apparatus.
Figure 8:
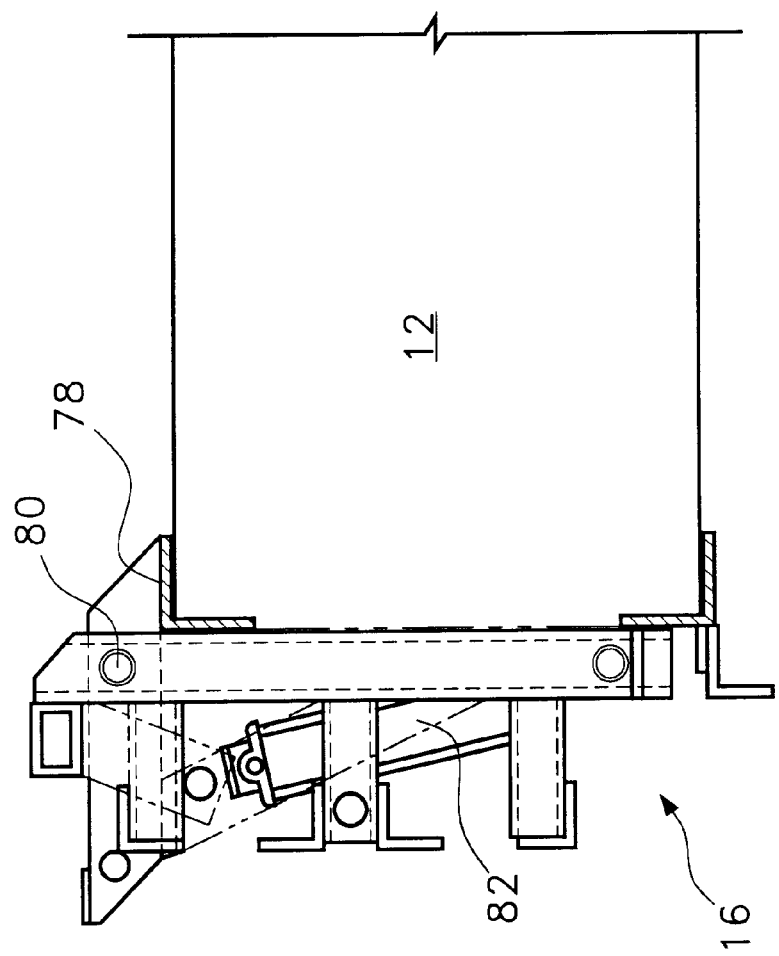
FIG. 8 is an exemplary illustration of another prior art lift apparatus.

In an alternative embodiment illustrated in FIGS. 4–5, the mounting plate 20 is substantially C-shaped and is detachably coupled to an attenuator cushion (not shown) at front surface 22 (FIG. 5) for receiving attenuator cushion (element 60 in FIG. 1) and securing thereto. In this embodiment, the mounting plate 20 further includes top and bottom oppositely disposed lip portions 22A extending perpendicular to surface 22, and holes 81–84 (FIG. 4) for securing via conventional means (e.g. nuts/bolts) for providing additional support in securing and maintaining the cushion. The crash cushion 60 is preferably a 70 K energy absorbing cushion, having a surface 63 which conforms with the surface 22 and co-extending lip sections 22A. In this embodiment, the plate associated with the 70K cushion has dimensions of 90" W×93" L×34" H. The cushion 60 may be of the type described in commonly assigned U.S. Pat. No. 5,697,657, issued Dec. 16, 1997 to Al Unrath, Sr. and incorporated herein by reference.

As previously mentioned, in either of the aforementioned embodiments, oppositely disposed surface 24 of mounting plate 20 (FIGS. 1, 5) is coupled to each of the cushion support members 1 via corresponding vertically positioned mounting hinge angles 7 welded thereto. The mounting plate or bracket 20 as shown in FIG. 4, has a width W and length L where the bottom portion of the mounting plate extends slightly below the bottom portion of each of the corresponding cushion support tubes 1 when the lift apparatus is deployed in the horizontal position. Each of the two sets of mounting hinge angles 7 are preferably welded onto the mounting plate and are separated by a distance sufficient to allow the support tube to slide within the set such that each corresponding hinge angle of a given set abuts a side of one of the cushion support tubes 1. Therefore, each cushion support tube 1 is interposed at an end thereof between a corresponding set of mounting hinge angles 7. Each of the mounting hinge angles have corresponding through holes 17 for accommodating a pin in order to secure the mounting plate in a fixed horizontal position as shown in FIGS. 1 and 5. Through holes 17 are in alignment with lock pin and tube 1c, 1d as shown in FIG. 1. In addition, each hinge angle has a corresponding center hole 47 in alignment with the hinge tube and pin arrangement 1a, 1b for each cushion support tube 1 to permit pivoting or rotation of the mounting plate about the transverse or z-axis of the support tube. Preferably, each hinge angle is welded onto mounting plate 20 at predetermined locations onto surface 24.

Figure 2:
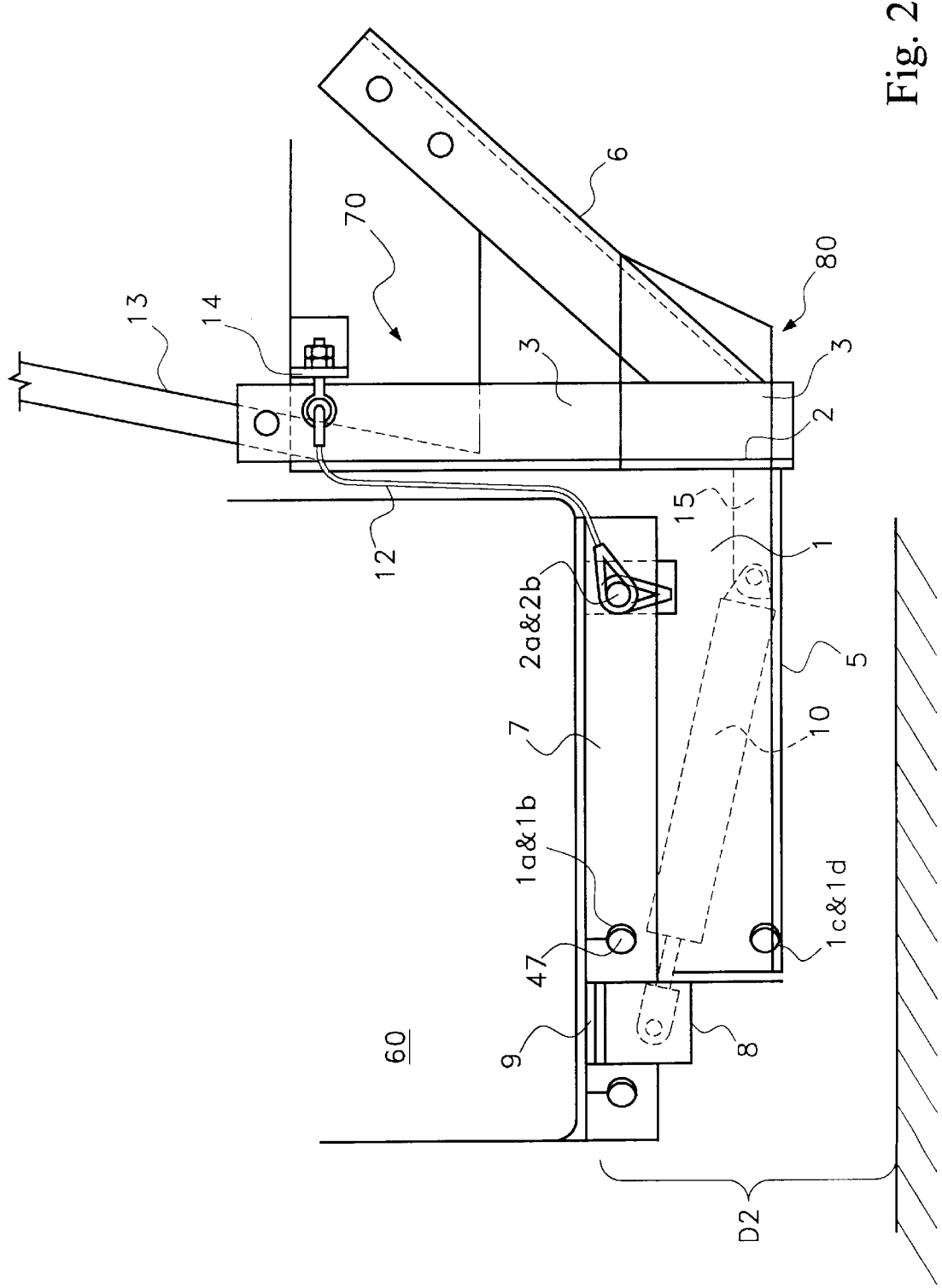
FIG. 2 is a side view of the lift assembly of FIG. 1 of the present invention with the impact attenuation cushion in the non-operational or vertical position.
Figure 9:
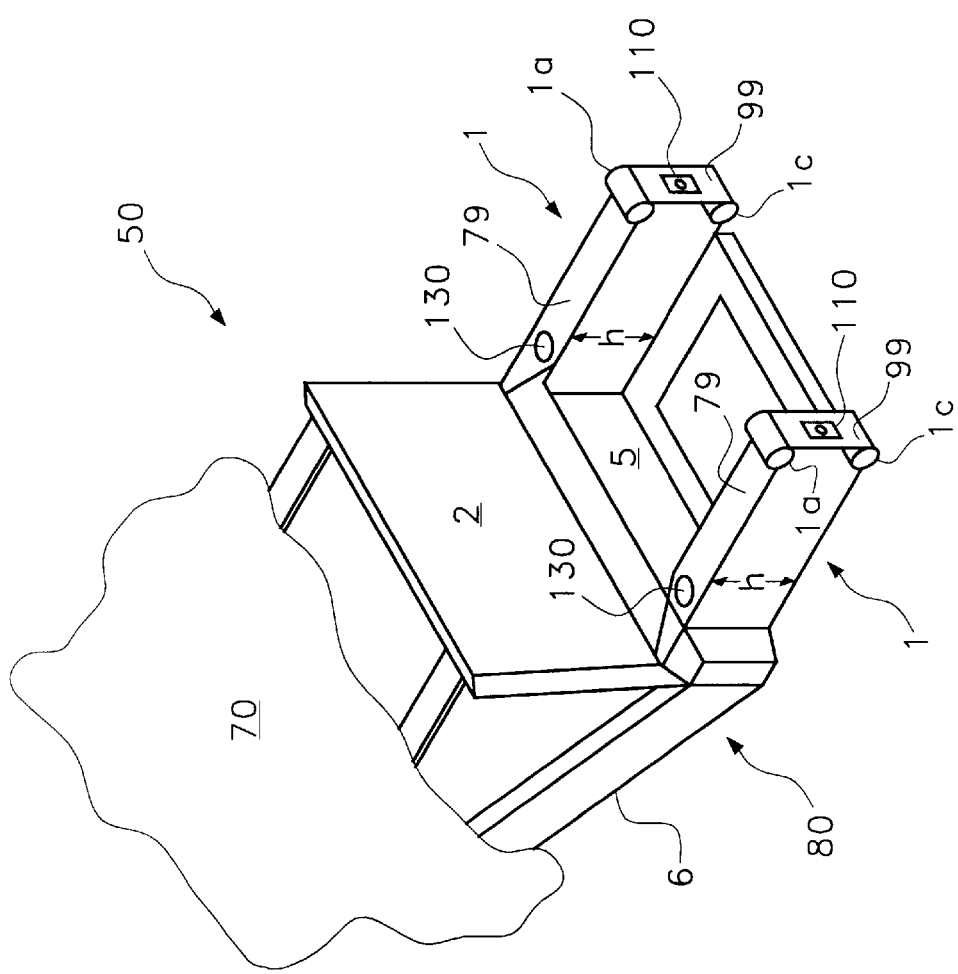
FIG. 9 is a partially assembled perspective view of the lift assembly according to the present invention.

As shown in the drawings, and in particular in FIGS. 1–5, the cushion support members 1 extend outwardly from the vertically oriented vehicle mounted support frame 80, such that the cushion support members are substantially perpendicular to the support frame. The members 1 are each welded to a support plate 2 of support frame 80 and are oriented parallel to one another to provide a supporting surface 79 for the mounting plate 20. Each cushion support member includes a corresponding hinge tube (1A) and hinge pin (1B) which is machined or welded onto each member at a distal top portion of tube 1 for coupling the mounting plate 20 via each of the hinge angles 7. This tube and pin assembly has the advantage of increased wear and durability, (rather than machining through holes into the sides of the support members) permitting the lift apparatus to better withstand external forces (e.g. weight, vibration, etc.). Grease fittings within the hinge tubes allow the hinge angles and mounting plate to articulate with relatively little frictional resistance, and operate to facilitate convenient removal of the hinge pins. FIG. 9 shows a partially assembled perspective view of the lift assembly including each of the hinge tubes 1A coupled to the top portion of a corresponding cushion support tube surface 79. Note that other methods of coupling are also contemplated including a hole drilled through each of the sides 94 of the cushion support tubes in lieu of a hinge tube. As previously mentioned, each hinge angle 7 is welded to the back of plate 20 and operates to rotate or pivot about its transverse or z-axis on hinge pin 1A, 1B. Each cushion support tube member 1 is substantially rectangular in shape, having an elongated portion of length l and height h. Preferably, each tube is 3"×8"×⁵⁄₁₆" wall thickness. As shown in FIGS. 1 and 5, when the cushion is in the operational or deployed position, the cushion is disposed at a first distance D1 from the ground surface, measured from the lowermost lip portion of mounting bracket 20. When the cushion is oriented via the lift apparatus into the vertical or transportive position as shown in FIG. 2, the hinge angles 7 cooperate with the corresponding tube support members 1 by means of the hinge tube and pin combination 1A,B to pivot or rotate the mounting plate 20 so that the mounting plate or bracket engages each support tube at top surface 79 and along a majority of the width W of the mounting bracket when the cushion is in the vertical position. In this manner, the mounting bracket rests on the top surface 79 of each tube member, thereby providing a more stable and secure base for supporting the cushion in the vertical position. A pair of rubber absorption bumpers 130 (see FIG. 3, 9) may be disposed on corresponding top surfaces 79 of cushion support tube members 1 on which the mounting plate 20 may rest when in the vertical position. The bumpers 130 are preferably placed near the end of tube member 1 closest to plate 2 (approximately 3") to absorb road energy. The absorption bumpers operate to absorb energy such as vibrational energy resulting from the road surface during transportation. Furthermore, when the cushion is in the vertical position, the cushion is disposed at a second distance D2 above the ground surface as shown in FIG. 2, where D2 is greater than D1. However, because the mounting bracket directly engages the mounting support tubes at surface 79 when in the vertical position, the difference in distance of the attenuator cushion from the ground surface when in the vertical position relative to the horizontal position is substantially a function of the height h of the cushion support tubes 1. That is, the difference in height of the attenuator cushion from the ground surface is substantially equal to the height h of the cushion support tubes, plus an amount by which a lowermost lip extends downwardly from the bottom surface (opposite surface 79) of the support tube. As shown in FIG. 5, such vertical distance between tube member 1 and bracket 20 is approximately 1", while the distance D1 from the ground surface is approximately 12.5"+/−1". This structural arrangement significantly reduces the potential for damage to the lift cushion caused by undue sway as a result of both suspension of the cushion from the lift, as well as increased height of the cushion from the road surface.

As previously mentioned, each cushion support tube member 1 further includes a lock tube and lock pin 1c, 1d, for insertion into the cushion support tube and a corresponding cavity for hinge angle 7 for locking the lift apparatus in the operating or "horizontal" cushion position. Stiffener plate 5 is integrally coupled to a bottom portion of support plate 2 via conventional means such as welding, and to corresponding interior sides 52 of support tube member 1 in order to provide additional structural support and impact resistance. The stiffener plate 5 in the preferred embodiment is contoured to the dimensions of the back plate and to the cushion support tubes 1 and includes a substantially V-shaped open portion outwardly extending toward the mounting plate to provide a strong impact resistant surface. Note that although the plate is V-shaped to minimize the weight while providing a bottom surface for containing the hydraulics, other sizes and shapes for the stiffener plate may also be contemplated.

Figure 3:
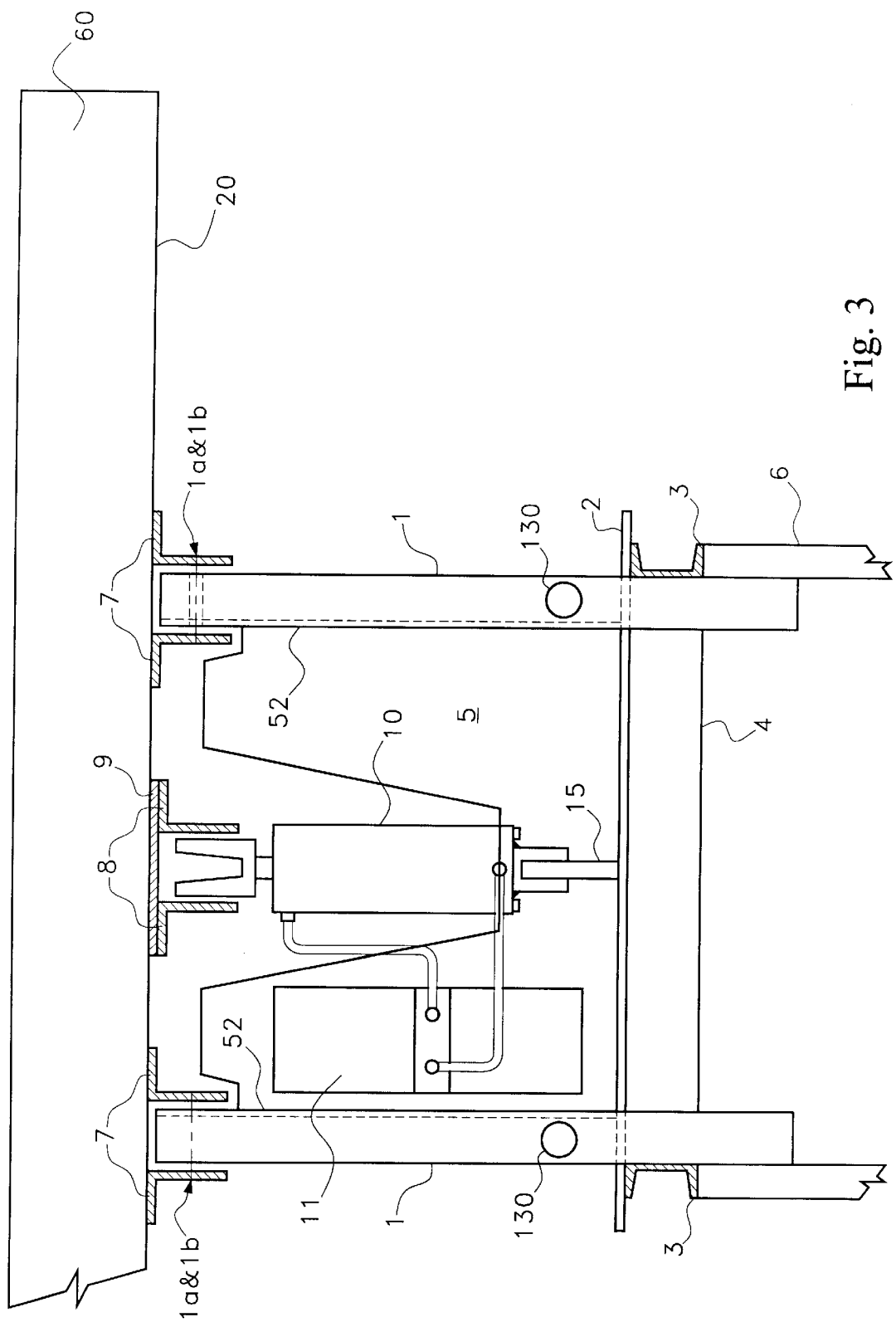
FIG. 3 is a top view of the lift assembly of FIG. 1 according to the present invention.

As shown in FIG. 3, the stiffener plate 5 includes a hydraulic cylinder anchor plate 15 welded thereto. Hydraulic cylinder 10 is rotatably coupled at a first end to the hydraulic cylinder plate 15 via a conventional tube and pin assembly, and at a second end to mounting plate 20 via hydraulic cylinder cushion angles 8, which are welded to surface 24 of the mounting plate via stiffener plate 9.

A hydraulic pump 11 supported by stiffener plate 5 is connected to hydraulic cylinder 10 by conventional means and operates to activate the cylinder to cause translation of the mounting plate 20 and corresponding attenuator cushion 60 about its transverse axis. Preferably, the hydraulic pump is a bi-directional 2500 psi dual-action 12 volt fluid/hydraulic unit with a remote operating cable for activating the unit.

Referring now to FIGS. 1, 4 and 5, the lift assembly 50 further comprises a pair of parallel-positioned cushion support cables 12 which are coupled at a first end to corresponding mounting hinge angles 7 via tube and pin combination 2A, 2B and secured at a second end to truck mounted angle 14 which is welded to the truck frame and which has a corresponding eyelet for connecting to cable 12. In the preferred embodiment, the cushion support cable 12 is coupled to the hinge angle of the mounting plate and to the truck mounted angle of the truck frame such that the cable extends in a gradually downward direction from the frame to the cushion when the cushion is deployed in the operating position. Note, however, that the cable may also be positioned such that angle 14 is at a position lower than the position associated with tube and pin 2A, B. The cushion support cable operates to eliminate the stress on the cushion while in the operating position. The cushion support cables are conventional high-tensile strength cables operable to withstand the forces exerted on them by the cushion.

A pair of cushion stiffener tubes 13 are also pivotably connected to hinge angle 7 via corresponding tube and pin 2A, 2B at a first end, and to C-shaped angles 93 via bolted means at a second end, for preventing uplift of the attenuator cushion 60 in the event of a collision with another vehicle. The stiffener tubes are preferably 2.5"×2.5"×0.25" wall thickness steel tubes. The lift assembly 50 further includes corresponding diagonal braces 6 which are mounted via conventional means (e.g. welded, bolted) onto the corresponding sides of the truck at a first end, and to the vertical stiffener back plate 2 and vertical channels 3 of the support frame 80 at a second end. Horizontal stiffener backplate 4 (FIG. 3) comprising ¾"×4" steel plate is coupled to a bottom portion of backplate 2 and to the truck frame to provide additional structural support. The diagonal braces provide enhanced structural support for the lift assembly and operate in conjunction with the location of the cushion support tube members 1 to provide a support frame for the attenuator cushion that is sufficiently low with respect to the ground surface to reduce instability in the attenuator cushion during transport of the cushion when the cushion is in the upright position.

Two oppositely disposed 4-inch C-shaped vertical stiffener channels 3 are weldedly coupled to both the diagonal brace support 6 at surface 71 and to support plate 2 at oppositely disposed surface 72. Preferably the support plate is a 48×24×½ inch thick steel support. The integrally coupled support plate, vertical stiffener channels and horizontal stiffener plate operate to support the rotation or pivoting of the mounting plate 20 onto the cushion support tube 1 during actuation of the lift assembly. In the preferred embodiment, each cushion support tube is made of steel having dimensions 3×8×⅝₁₆×⅝₁₆".

As one can ascertain, each of the cushion stiffener tubes 13 and support cables 12 are operable to pivot along the transverse axis in consonance with the pivoting of the mounting plate and hinge angle onto or off of the cushion support tube members in response to force exerted by the hydraulic cylinder 10.

In operation, the crash attenuator cushion 60 as shown in FIG. 1, is in a horizontal deployed position where it projects horizontally outward (rearward) from the truck frame 70. The mounting plate 20 includes holes 81–84 (see FIG. 4) disposed substantially at the corners of the plate to permit one to fasten the cushion to the plate using conventional means such as nuts and bolts. Should a vehicle strike the crash attenuator at a low speed, for example less than 5 mph, the end of the attenuator would be crushed, but the remainder of the crash cushion and attenuator including the lift assembly would remain essentially intact. The dual, oppositely disposed stiffener tubes 13 operate to resist and prevent uplifting of the cushion during such a collision. Preferably, the stiffener tubes 13 and cushion support tubes are made of steel in order to withstand the impact of a collision. While greater impact speeds may cause correspondingly increased damage to the crash cushion and potentially to the lift apparatus, the lift assembly or apparatus of the present invention provides a strong support frame 80 substantially vertically affixed to the truck frame and corresponding pair of cushion support tubes at right angles and coupled to the bottom of the support plate to reduce the amount of damage sustained in a potential impact.

Note that when the truck is being transported, the crash attenuator cushion 70 is maintained in an upright or non-operational position as illustrated in FIG. 2. In this position, the weight of the cushion is placed directly on the plate 20 which rests upon the support tubes 1. This eliminates any stress to the hydraulics 10 while at the same time, minimizes the vertical distance of the mounting plate and hence, crash cushion, from the ground surface. Note that in this configuration where the cylinders are disposed on plate 5 and where the mounting bracket rests on tube members 1, the hydraulics are removed as a means of supporting the attenuator cushion when in the vertical position. This also reduces the instability and vibrational movement associated with the cushion during transportation when the cushion is in the upright position.

As one can ascertain, deployment of the crash attenuator cushion via the lift apparatus is as follows. With the crash cushion in the non-operational or travel position as shown in FIG. 2, actuation of the hydraulics unit and pump 10, 11 operates to exert a force onto the inner surface 24 of mounting plate 20, resulting in a pivoting of the plate and welded hinge angles 7 about the transverse axis in a manner such that the mounting plate is lifted from the top surface 79 of the cushion support tube members 1 and placed in a horizontal position, such that mounting plate 20 is substantially perpendicular to the longitudinally disposed cushion support tube member and in parallel alignment with support plate 2. Due to clip angle 9, initial articulation of the hydraulics results in a substantially straight force applied to cause the movement of the mounting plate.

During the above-described operation, the cables 12 operate to extend from a relaxed position as shown in FIG. 2 to a tensed position, as illustrated in FIG. 1. In similar fashion, each of the stiffener tubes also pivot from a substantially downward position (FIG. 2) to a substantially inclined position as shown in FIG. 1. In analogous fashion, translation of the crash attenuator into a non-operational position occurs via actuation of the hydraulics to cause pivoting of the hinge angles and mounting plate in a direction proximal to the horizontally extending cushion support tube 1 and corresponding pivoting of both the cushion stiffener tubes and the relaxation of the cushion support cables to their "at rest" positions (see FIG. 2).

Figure 10A:
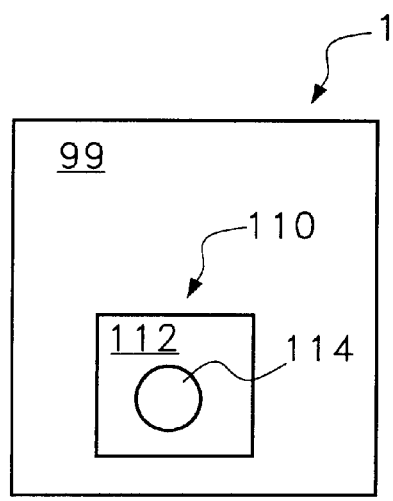
FIGS. 10A–C provide front and side extended and retracted views, respectively, of a lift apparatus cushion support tube having an attitude adjusting mechanism in accordance the present invention.
Figure 10B:
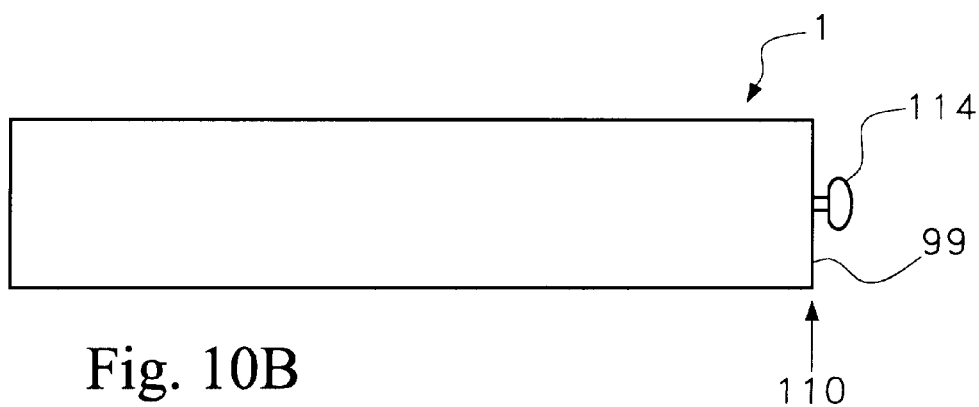
Figure 10C:
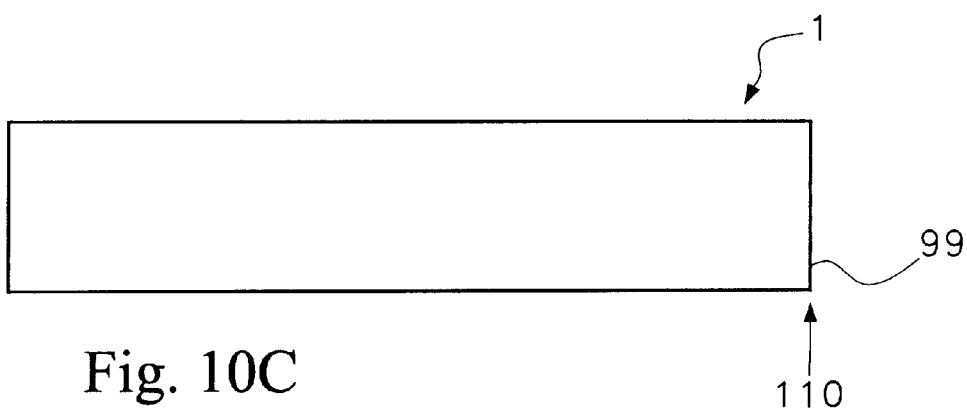

Referring again to FIG. 9, the lift apparatus according to the present invention further includes an attitude adjustor 110 formed within each of the cushion support tube members 1 at surface 99 which operates to fine tune or incrementally adjust the horizontal adjustment or attitude of the attenuator cushion from the ground surface. This is advantageous in order to comply with safety regulations which may require strict conformance of predetermined distances of crash cushions relative to the ground surface. The adjustor 110 is shown in greater detail in FIGS. 10A–C and comprises a threaded plate 112 welded to surface 110 wherein a bolt 114 may be adjusted in a horizontal direction and coupled to a jam nut (not shown) for locking in and prohibiting further movement of the bolt. Extension/retraction of the bolt is accomplished in a known manner by turning of the bolt and jam nut in the appropriate direction and in the desired amount. In this manner, the bolt may extend a user-determined distance from the end surface 111 of the tube. This provides one with the ability to adjust the displacement of the cushion from the ground when the cushion is in the deployed position. That is, the cushion would engage bolt 114 during deployment so that the cushion is at an angle relative to the horizontal axis which is a function of the horizontal distance of the extension of the bolt from the end of the tube 1. Note that surface 99 is recessed such that plate 112 and bolt 114, do not extend beyond the end of tube 1 unless adjusted by a user, as shown in FIG. 10C. As illustrated, FIG. 10B shows the adjustor mechanism extending a predetermined distanced from the end 111 of the tube, while FIG. 10C shows the adjustor in a fully retracted position such that no extension beyond the end 111 of tube 1 occurs. Preferably, such displacement d is of the order of 0.25" to 0.5".

The lift apparatus of the present invention, by pivoting the mounting plate about its horizontal axis to engage the support tubes at positions which are substantially along the surface of the plate, and where the plate in its transportation state is at a minimal distance from the road surface permits an increase in stability and reduction in the lateral displacement of the impact cushion during transportation, thereby greatly increasing the lifetime associated with the impact attenuator cushion.

While preferred embodiments of the present invention have been shown, it should be understood that a person skilled in the art may make many variations and modifications to these embodiment utilizing functionally equivalent elements to be described herein without departing from scope of the invention. Any and all such variations or modifications, as well as others which may become apparent to those skilled in the art, are intended to be included within the scope of the invention as defined by the appended claims.

What is claimed is:

1. A lift apparatus adapted to be mounted on a vehicle for supporting an attenuator cushion comprising:

a support frame;

support means coupled to said support frame and extending outward from said support frame for supporting said attenuator cushion; and a mounting bracket for coupling to said attenuator cushion, said mounting bracket pivotably coupled to said support means by means of a plurality of hinge angles along an axis to pivot between a horizontal deployed position in which the cushion extends generally outward from said support frame, and a vertical position in which said cushion extends vertically upward, wherein said mounting bracket is disposed on said support means along a majority of the width of said mounting bracket when said cushion is in said vertical position.

2. The apparatus according to claim 1, wherein said support means comprises a pair of oppositely disposed, parallel members having a predetermined length in the longitudinal direction and height in the vertical direction.

3. The apparatus according to claim 2, wherein said parallel support members are fixedly coupled to said frame support.

4. The apparatus according to claim 3, wherein said plurality of hinge angles are fixedly coupled to said mounting bracket and pivotably coupled to said parallel support members for causing said mounting bracket to pivot.

5. The apparatus according to claim 1, further comprising cable support means coupled between said support frame and said mounting bracket for reducing stress on said attenuator cushion when in said horizontal position.

6. The apparatus according to claim 1, further comprising hydraulic actuator means for causing said mounting bracket to pivot between said horizontal and said vertical positions.

7. The apparatus according to claim 2, wherein said cushion is disposed a first distance from ground in said horizontal position, and wherein said cushion is disposed a second distance from the ground in said vertical position; wherein the difference in distance of the attenuator cushion from the ground when in the vertical position relative to the horizontal position is substantially said height of said parallel support members.

8. The apparatus according to claim 2, further comprising a pair of oppositely disposed, parallel stiffener tubes coupled at a first end to said support frame, and at a second end to said hinge angles.

9. The apparatus according to claim 1, wherein said support frame comprises
 a vertical backplate connected to said support means,
 two vertically oriented stiffener channels coupled to said backplate at opposite sides thereof; and a pair of oppositely disposed diagonal bars, each having a first end for connecting to said truck frame and a second end coupled to a corresponding vertical stiffener channel.

10. A lift apparatus adapted to be mounted onto an end of a vehicle comprising:
 a support frame comprising:
  a vertical back support plate;
  a pair of vertical channel plates coupled at opposite ends of said back support plate;
 a pair of support tubes coupled to a front surface of said back support plate at a bottom portion thereof; and
 a mounting bracket for supporting an attenuator cushion, said mounting bracket pivotably coupled to said pair of support tubes along an axis and operable to pivot between a horizontal deployed position in which the attenuator cushion extends generally outward from said support frame in parallel orientation with said pair of support tubes, and a vertical position in which said cushion extends vertically upward perpendicular to said pair of support tubes,
 wherein said mounting bracket engages said support tubes via a corresponding pair of hinge angles along a majority of the width of said mounting bracket when said cushion is in said vertical position, thereby permitting said attenuator cushion to rest upon said mounting bracket and a majority portion of said support tubes.

11. The apparatus according to claim 10, wherein said a corresponding pair of hinge angles comprises first and second mount hinge angles, each of said mount hinge angles on opposite sides of a corresponding one of said cushion support tubes and fixedly coupled to said mounting bracket to permit said bracket to pivot about said axis.

12. The apparatus according to claim 11, further comprising a pair of support cables oppositely disposed and in parallel alignment, each said cable pivotably coupled at a first end to a corresponding hook on said frame, and at a second end to said mount hinge angles for reducing tension on said attenuator cushion when in said horizontal position.

13. The apparatus according to claim 12, further comprising a pair of stiffener tubes oppositely disposed and in parallel alignment, each said stiffener tube pivotably coupled at a first end to a corresponding hinge angle connected to said backplate, and at a second end to said mount hinge angles for reducing uplift on said attenuator cushion during a collision.

14. The apparatus according to claim 10, further comprising hydraulic actuator means for causing said mounting bracket to pivot between said horizontal and said vertical positions.

15. The apparatus according to claim 14, wherein said stiffener tubes and said support cables are pivotably coupled to said mount hinge angles at a top position.

16. A lift apparatus adapted to be mounted on a vehicle for supporting a cushion comprising:
 a support frame;
 a support means coupled to said support frame and extending in a longitudinal direction therefrom; and
 a mounting bracket to which said cushion is coupled, said mounting bracket pivotably coupled to said support means along a transverse axis for pivoting between a horizontal deployed position in which the cushion extends generally outward longitudinally such that said cushion is disposed a first distance from ground, and a vertical position in which said cushion extends vertically upward such that said cushion is disposed a second distance from the ground; wherein the difference in distance of the cushion from the ground when in the vertical position relative to the horizontal position is substantially a function of the height of the support means, wherein when said cushion is in said vertical position, a majority of the width of said mounting bracket is disposed over said support means.

17. The lift apparatus according to claim 16, further comprising a hydraulic cylinder and pump for causing said mounting bracket to pivot between said horizontal and said vertical positions.

18. The lift apparatus according to claim 16, wherein said support means comprises a pair of parallel tubes of said given height, each having a tubular cavity formed therein and oriented along said transverse axis for receiving a corresponding pin, each said tube interposed between a corresponding pair of hinge angles having through holes for receiving said pin to permit pivoting of said mounting bracket.

19. A vehicle mounted crash attenuator comprising:
 a crushable, energy-absorbing crash cushion; and
 a lift apparatus coupled to said vehicle for rotating said crash cushion between a horizontal deployed position in which the cushion extends generally outward from said vehicle, and a vertical position in which said cushion extends vertically upward, comprising:
  a substantially vertical support frame;
  a pair of support members extending outward from said support frame and fixedly coupled thereto along a longitudinal axis at a first end, each of said support members having disposed thereon a transverse tubular member having first and second open ends;
  a mounting bracket for receiving said crash cushion and securing thereto;
  a pair of hinge angles, each coupled to corresponding sides of a respective one of said pair of support members, each said hinge angle fixedly coupled to said mounting bracket and having a corresponding cavity aligned with said first and second open ends of said transverse tubular member for receiving a pin such that said hinge angle pivots about said pin; and actuator means for causing said mounting bracket to rotate about an axis to cause rotation of said crash cushion between said horizontal deployed position and said vertical position.

20. The crash attenuator according to claim 19, further comprising locking means for retaining said mounting bracket in said horizontal position.

21. The crash attenuator according to claim 19, further comprising adjusting means for incrementally adjusting the attitude of said cushion from the ground surface.

22. The crash attenuator according to claim 21, wherein said adjusting means comprises a horizontal member coupled to a surface of said support member at said second end and adjustable in a horizontal direction to extend beyond said second end a predetermined distance.

23. A lift apparatus adapted to be mounted on a vehicle for supporting an attenuator cushion comprising:

a support frame;

support means coupled to said support frame and extending outward from said support frame for supporting said attenuator cushion; and a mounting bracket for coupling to said attenuator cushion, said mounting bracket pivotably coupled to said support means by means of a plurality of hinge angles along an axis to pivot between a horizontal deployed position in which the cushion extends generally outward from said support frame, and a vertical position in which said cushion extends vertically upward; and adjusting means coupled to said support means for incrementally adjusting the attitude of said cushion from the ground surface.

* * * * *